US008954538B2

United States Patent
Erickson et al.

(10) Patent No.: US 8,954,538 B2
(45) Date of Patent: Feb. 10, 2015

(54) METHOD AND SYSTEM FOR REDUCING LATENCY FOR INTERACTIVE CONTENT FOR COMPLETE INTERNET ANYWHERE

(75) Inventors: David Erickson, San Clemente, CA (US); Marcus Kellerman, San Diego, CA (US); Xuemin Chen, Rancho Santa Fe, CA (US); Vladimir Silyaev, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1135 days.

(21) Appl. No.: 12/650,171

(22) Filed: Dec. 30, 2009

(65) Prior Publication Data

US 2011/0119723 A1   May 19, 2011

Related U.S. Application Data

(60) Provisional application No. 61/261,780, filed on Nov. 17, 2009.

(51) Int. Cl.

| | |
|---|---|
| G06F 15/16 | (2006.01) |
| H04N 21/61 | (2011.01) |
| H04N 21/236 | (2011.01) |
| G06F 17/30 | (2006.01) |
| H04N 21/435 | (2011.01) |
| H04N 21/4782 | (2011.01) |
| H04N 21/658 | (2011.01) |
| H04L 12/28 | (2006.01) |
| H04N 7/173 | (2011.01) |
| H04N 21/6377 | (2011.01) |
| H04N 21/235 | (2011.01) |

(52) U.S. Cl.
CPC ....... *H04N 7/17318* (2013.01); *H04N 21/6125* (2013.01); *H04N 21/23614* (2013.01); *G06F 17/30899* (2013.01); *H04N 21/6175* (2013.01); *H04N 21/435* (2013.01); *H04N 21/4782* (2013.01); *H04N 21/658* (2013.01); *H04L 12/2834* (2013.01); *H04N 21/6377* (2013.01); *H04N 21/235* (2013.01); *H04N 21/236* (2013.01)
USPC ........................................................ 709/219

(58) Field of Classification Search
CPC ........................... G06F 3/0481; G06F 3/04812
USPC ........................................................ 709/219
See application file for complete search history.

(56) References Cited

U.S. PATENT DOCUMENTS

| | | | | |
|---|---|---|---|---|
| 2002/0075315 | A1* | 6/2002 | Scott | 345/802 |
| 2007/0085825 | A1* | 4/2007 | Geffin et al. | 345/157 |
| 2007/0183493 | A1* | 8/2007 | Kimpe | 375/240.1 |
| 2010/0161754 | A1* | 6/2010 | Davis | 709/217 |

* cited by examiner

*Primary Examiner* — Tom Y Chang
(74) *Attorney, Agent, or Firm* — Foley & Lardner LLP; Christopher J. McKenna; Paul M. H. Pua

(57) ABSTRACT

A method and/or system are described in which a server communicatively coupled with a set-top-box (STB) may predict a location of a pointer on a web browser running on the STB. The server may render the pointer based on the predicted pointer location. The server may send the rendered pointer to the STB, wherein the STB may composite a web page on the web browser based on the rendered pointer. The server may be synchronized with the STB based on event information received by the server from the STB such as, for example, keystroke events, click event, or other like event. The prediction of the pointer location may be based on actual pointer location information provided by the STB. A predetermined number of pointer locations may be predicted based on an actual pointer location and/or on a latency of a connection between the server and the STB.

20 Claims, 13 Drawing Sheets

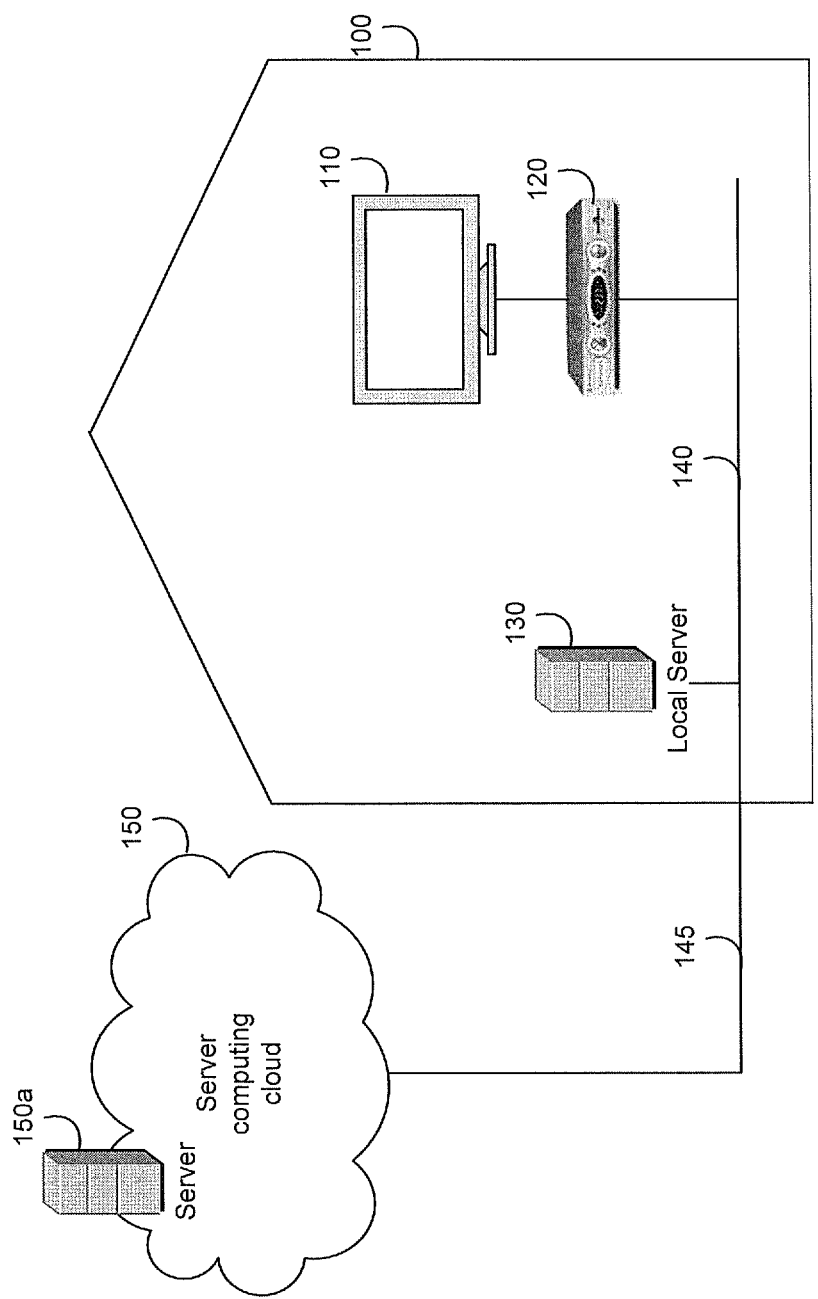

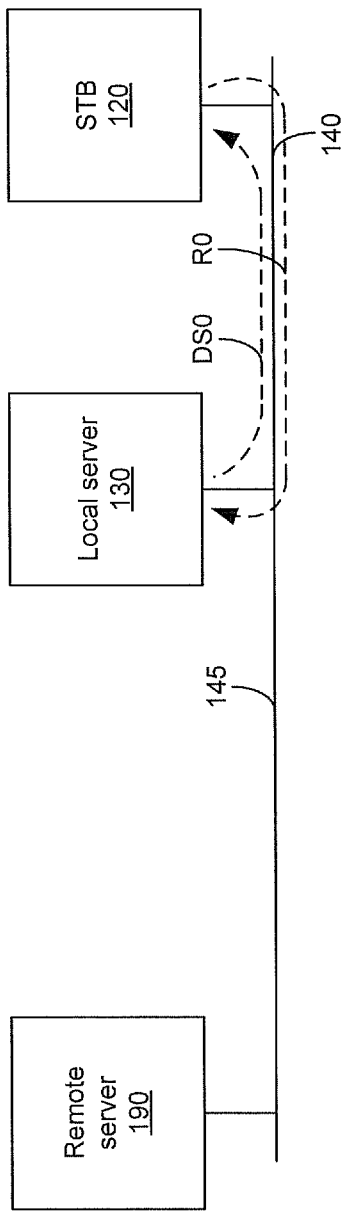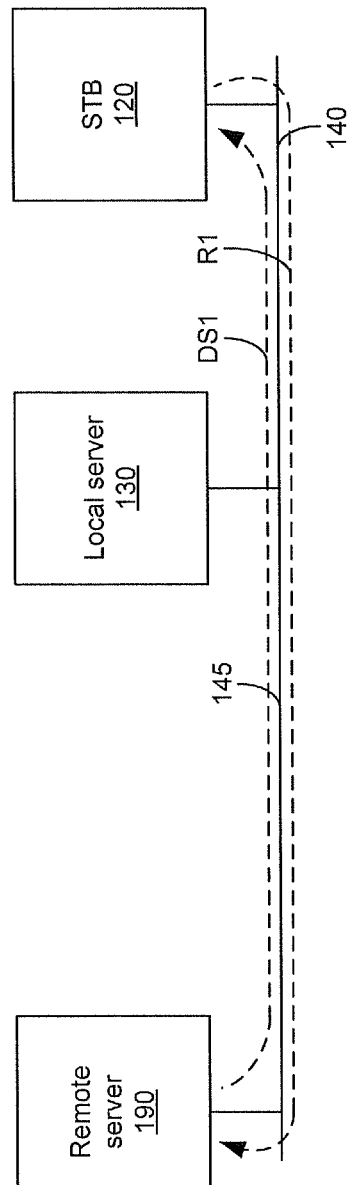

METHOD AND SYSTEM FOR REDUCING LATENCY FOR INTERACTIVE CONTENT FOR COMPLETE INTERNET ANYWHERE

CROSS-REFERENCE TO RELATED APPLICATIONS/INCORPORATION BY REFERENCE

This application makes reference to, claims priority to, and claims the benefit of U.S. Provisional Patent Application Ser. No. 61/261,780, filed on Nov. 17, 2009.

This application also makes reference to:
U.S. patent application Ser. No. 12/650,145, filed on Dec. 30, 2009;
U.S. patent application Ser. No. 12/650,141, filed on Dec. 30, 2009;
U.S. patent application Ser. No. 12/650,140, filed on Dec. 30, 2009;
U.S. patent application Ser. No. 12/649,971, filed on Dec. 30, 2009;
U.S. patent application Ser. No. 12/650,069, filed on Dec. 30, 2009;
U.S. patent application Ser. No. 12/650,067, filed on Dec. 30, 2009;
U.S. patent application Ser. No. 12/650,020, filed on Dec. 30, 2009; and
U.S. patent application Ser. No. 12/649,998, filed on Dec. 30, 2009.

Each of the above stated applications is hereby incorporated herein by reference in its entirety.

FIELD OF THE INVENTION

Certain embodiments of the invention relate to Internet browsing. More specifically, certain embodiments of the invention relate to reducing latency for interactive content for complete Internet anywhere.

BACKGROUND OF THE INVENTION

With the continuous growth of on-line businesses, social networks, and other on-line services and applications, a user may want a larger number of places or locations from which to access the Internet in a manner that is flexible and/or suits the user's lifestyle. Most users currently connect to the Internet using a web browser running on a personal computer. While only a portion of homes have a computer, most homes have a television, and in many instances, multiple televisions. Therefore, rather than using a computer to access the Internet, a user may find it more convenient to use the flat screen televisions and/or monitors in homes for the same purpose. To do so, a set-top-box (STB) connected to, for example, a flat screen television may be provided with web browsing software and protocols, and Internet connectivity, which may enable the user to easily access the Internet or check their electronic mail (email), for example, from a convenient and comfortable location such as their living room.

There may be instances, however, in which the STB may not be configured to support and/or capable of processing certain content in a web page. Moreover, there may be instances in which the latency associated with rendering or displaying certain content in a web page may be long because of the processing capabilities of the STB. This may affect the overall experience of the user.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and/or system for reducing latency for interactive content for complete Internet anywhere, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a diagram that illustrates an exemplary home or office configured to access Internet services via a set-top-box (STB), in accordance with an embodiment of the invention.

FIG. 1B is a diagram that illustrates providing exemplary web browsing support for an STB by a local server, in accordance with an embodiment of the invention.

FIG. 1C is a diagram that illustrates providing exemplary web browsing support for an STB by a remote server, in accordance with an embodiment of the invention.

DETAILED DESCRIPTION OF THE INVENTION

Figure 2:
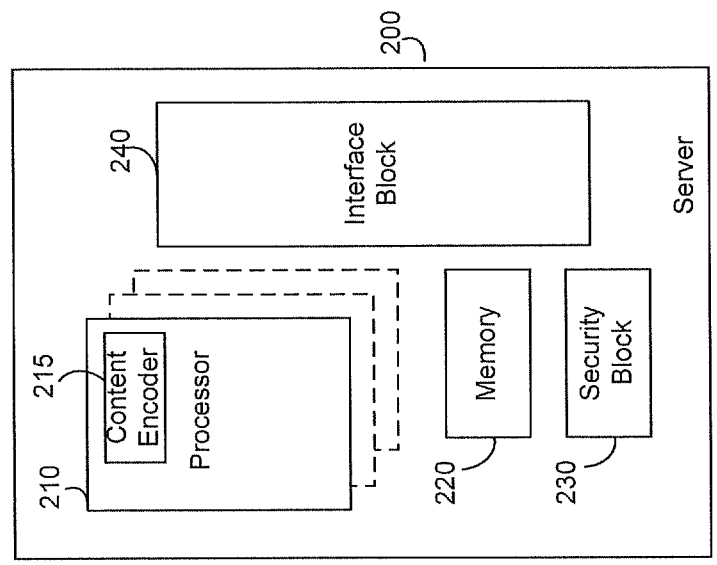
FIG. 2 is a block diagram that illustrates an exemplary server that supports web page rendering by a local web browser in an STB, in accordance with an embodiment of the invention.

Certain embodiments of the invention may be found in a method and system for reducing latency for interactive content for complete Internet anywhere. In various embodiments of the invention, a method and/or system are described in which a server communicatively coupled to a set-top-box (STB) may predict a location of a pointer on a web browser running on the STB. The server may render the pointer based on the predicted pointer location. The server may send the rendered pointer to the STB, wherein the STB may composite a web page on the web browser based on the rendered pointer. The server may be synchronized with the STB based on event information received by the server from the STB such as, for example, keystroke events, a click event, and/or other like event. The prediction of the pointer location may be based on actual pointer location information provided by the STB. A predetermined number of pointer locations may be predicted based on an actual pointer location and/or on the latency of a connection between the server and the STB. When the latency of the connection changes, the predetermined number of predicted pointer locations may be adjusted. In some instances, the web page may comprise a dynamic portion that may be modified based on a predicted pointer location. In some embodiments of the invention, the pointer may be rendered in the server when the predicted pointer location is within a portion of the web page unsupported by the web browser that is processed by the server. The various embodiments of the invention described herein may be utilized to implement complete Internet access anywhere in a home, or a place of work, or a public space, for example, where a user may want to obtain such access to the Internet.

FIG. 1A is a diagram that illustrates an exemplary home or office configured to access Internet services via a set-top-box (STB), in accordance with an embodiment of the invention. Referring to FIG. 1A, there is shown a location 100 within which may be disposed a television 110, an STB 120, a local server 130, and a broadband connection 140. Also shown in FIG. 1A is a server computing cloud 150 coupled to the location 100 via a broadband connection 145.

The location 100 may be a home, a business, a school, a library, and/or other like setting in which a user may want to access the Internet and/or check their electronic mail (email). The position or placement of the television set 110, the STB 120, and/or the local server 130 within the location 100 may be based on user convenience and/or lifestyle. For example, when location 100 is a home (for example, a house, an apartment), the television 110 and the STB 120 may be located in a bedroom, a family room, or an entertainment room. In another example, when location 100 is a business or a public building, the television 110 and the STB 120 may be located in a conference room. The local server 130 may be located nearby (for example, in the same room) the television set 110 and the STB 120 or may be located remotely (for example, in another room or nearby building) from the television set 110 and the STB 120. In some embodiments of the invention, the broadband connection 140 may provide a wired connection that communicatively couples two or more devices within the location 100 utilizing a coaxial cable, for example. In other embodiments of the invention, in addition to wired connectivity, a portion of the broadband connection 140 may provide a wireless connection between two or more devices within the location 100.

The television 110 may comprise suitable logic, circuitry, code, and/or interfaces that may be operable to receive signals from which to display images (for example, moving images) that are typically accompanied by sound. The television 100 may be based on, for example, cathode ray tube (CRT) technology, plasma technology, liquid crystal display (LCD) technology, and/or light emitting diode (LED) backlit LCD technology. The television 110 may be operable to support one or multiple technical standards such as digital television (DTV) and high-definition television (HDTV), for example. The resolution of the screen or display portion of the television 110 may be based on the technical standard supported by the television 110. For example, for HDTV, the resolution of the screen may be 720p, 1080i, or 1080p, where the numeral indicates the vertical resolution of the screen, the letter "p" refers to progressive-scan format, and the letter "i" refers to interlaced-scan format.

The STB 120 may comprise suitable logic, circuitry, code, and/or interfaces that may be operable to connect the television 110 to an external source of signals and to convert those signals into content that may be displayed on the screen of the television 110. The STB may be operable to provide processing associated with managing, delivering, and/or storing video content that may be displayed on the television 110.

The STB 120 may also be operable to run a web browser that may be displayed on the screen of the television 110 for user interaction. A web browser is typically a software application that may enable a user to retrieve, present, or review information resources available on, for example, the World Wide Web ("the Web"). An information resource may comprise a web page, an image, video, text, graphics, and/or other type of multimedia content, for example. A web browser may also be utilized to access information that is provided by web servers in private networks and/or files in file systems. Examples of web browsers may comprise Internet Explorer, Mozilla Firefox, Apple Safari, Google Chrome, Opera, and/or browsers that may be native or custom-made for the STB 120.

Information resources are brought to the user via the web browser when the user inputs a Uniform Resource Identifier (URI) into the web browser. In this regard, the prefix of the URI may be utilized to determine how to interpret the URI. For example, a URI that starts with "http:" may identify a resource to be retrieved over Hypertext Transfer Protocol (HTTP). Other prefixes that may be supported include "https:" for HTTP Secure (HTTPS), "ftp:" for the File Transfer Protocol (FTP), and "file:" for local files, for example. A Uniform Resource Locator (URL) is typically a subset of the URI that specifies the location where an information resource is available for retrieval and/or the mechanism for retrieval.

Once the information resource has been retrieved, the web browser may be operable to display it. For example, HyperText Markup Language (HTML) may be passed to a layout engine in the web browser to be transformed from markup representation to an interactive document. In addition to HTML, web browsers may display different types of content on a web page. For example, web browsers may display images, audio, video, and/or Extensible Markup Language (XML) files, and often comprise and/or support certain plug-ins for, for example, Flash applications and/or Java applets. In one embodiment of the invention, in instances when a file of an unsupported type or a file that is set up to be downloaded rather than displayed is encountered, the browser may prompt the user to save the file to fixed and/or removable memory storage, for example, a memory in the set-top-box. In another embodiment of the invention, the web browser may present one or more requests to the local server 130 or to a server in the server computing cloud 150 to assist with handling at least a portion of the unsupported content.

The local server 130 may comprise suitable logic, circuitry, code, and/or interfaces that may be operable to run or execute certain software applications that may be accessible from the STB 120 via the broadband connection 140. In this regard, the local server 130 may be operable to provide support to the web browsing operations provided by the STB 120. Such support may comprise predicting the behavior of certain interactive content in a web page to be composited by the STB 120. For example, the local server 130 may predict non-destructive events such as the movement associated with a cursor or pointer displayed in a web browser. The local server 130 may be implemented in a computing device, comprising for example a personal computer, laptop, tablet, or in a networking device, comprising for example, a router, which may provide processing capabilities that are sufficient for performing particular software applications. For example, in instances when the local server 130 is utilized to support web browsing operations in the STB 120, the processing capabilities in the local server 130 may be sufficient to run or execute software applications that provide such support.

The server computing cloud 150 may comprise a plurality of servers and/or computing devices associated with providing various services offered by the Internet. In this regard, the term 'cloud' typically refers to the Internet and is based on the graphical depiction of the Internet as a cloud in computer network diagrams to represent the underlying infrastructure of the Internet. The servers in the server computing cloud 150 may be utilized to provide reliable services that may be delivered through individual servers and/or data centers, for example. The server computing cloud 150 may appear, to a user or to a location (for example, location 100), as a single point of access to services and/or resources that may be provided by the server computing cloud 150. The servers in the server computing cloud 150 may comprise, for example, applications servers that may be dedicated to running certain software applications and/or web servers in which HTTP clients connect to send commands and receive responses along with data content.

A web server (not shown) in the server computing cloud 150, for example, may comprise suitable logic, circuitry, code, and/or interfaces that may be operable to deliver to a client (for example, the STB 120) web pages (for example, HTML documents) and associated content (for example, images, style sheets, JavaScripts). When a client requests a specific information resource using HTTP, the web server may respond by providing the content associated with that information resource. A full implementation of HTTP may enable the web server to receive content from a client. A server 150a in the server computing cloud 150, such as an applications server, for example, may be utilized to support web browsing operations in the STB 120. Such support may include predicting the behavior of certain interactive content in a web page to be composited by the STB 120. For example, the server 150a may predict non-destructive events such as the movement associated with a cursor or pointer displayed on a web browser. In such instances, the server 150a in the server computing cloud 150 may have processing capabilities sufficient to run or execute software applications that provide such support. The server 150a may also be referred to as a render server or an STB assistance server, for example, to indicate that the server 150a may be operable to assist the STB 120 to render web content. Whether the server 150a in the server computing cloud 150 or the local server 130 is utilized to support web browsing operations in the STB 120 may depend, at least in part, on the amount of latency that may be acceptable to a user when having web browsing operations in the STB 120, such as the rendering of a web page, for example, be supported or assisted by another resource. In this regard, a local resource (for example, the local server 130) may have lower latency than a remote resource (for example, the server 150a in server computing cloud 150). Whether the server 150a in the server computing cloud 150 or the local server 130 is utilized to support web browsing operations in the STB 120 may also depend on, for example, availability of the local server 130, available resources on the local server 130, and/or the processing capabilities and the type of support that may be provided. The server 150a need not be physically collocated with a web server. The server 150a may be in different location from the web server.

The server computing cloud 150 may connect to the location 100 via a broadband connection 145. The broadband connection 145 may provide a wired connection between the server computing cloud 150 and the broadband connection 140 in the location 100 utilizing a coaxial cable, for example. Other embodiments, however, need not be so limited. For example, the broadband connection 145 may comprise a combination of wired and wireless portions, wherein the wired portion may utilize coaxial cables, optical fibers, and/or other large bandwidth transmission medium.

In operation, a user may decide to access a web page via a web browser in the STB 120 that is being displayed in the television 110 while comfortably sitting in his/her living room. The user may interact with the web browser in multiple ways. For example, the user may utilize a remote device (for example, wireless pointer) and/or other device (for example, mechanical/optical mouse, trackball, keyboard) that operates with the STB 120 to provide the STB 120 with user input (for example, commands, instructions). Other devices that may be operable to detect user motions, actions, and/or gestures that may be utilized to indicate to the STB 120 the type of interaction the user wants with respect to the web browser may also be utilized.

The user may submit a URL to the web browser, which in turn sends a request for the information resource associated with that URL to a web server. The web server may pass the HTML and/or related content or information associated with the URL to the STB 120. The STB 120 may perform a pre-fetch operation of the web page information provided by the web server to determine the type of content (for example, supported or unsupported content) that is comprised within the web page. The STB 120 may be operable to perform the pre-fetch operation as a background process, for example.

In instances when certain portions of the web page are not supported by the web browser in the STB 120, the STB 120 may send one or more requests to a server that is operable to provide web browsing support to the STB 120. In some embodiments, the portions unsupported may comprise a plug-in, for example. In this regard, the STB 120 may send requests via an upper link to the local server 130 or to the server 150a in the server computing cloud 150. The request may comprise information regarding the URL associated with the unsupported content, the size of the unsupported content in the web browser, and/or events associated with the unsupported content. The requests may be sent to the server to process as background jobs, for example. Once such information is received by the server providing web browsing support to the STB 120, the server may in turn request and obtain the unsupported content from the corresponding web server, may process the unsupported content, and may encode the processed content into a format that may be received by the STB 120. In one exemplary embodiment of the invention, the processed content may be encoded with a low latency encoder protocol such as H.264/Advanced Audio Coding (ACC). In this regard, the server providing web browsing support to the STB 120 may be operable to transcode or provide direct conversion from one encoding format to another encoding format. In some embodiments of the invention, the transcoding may comprise changing the bitstream format of one file to another bitstream format without undergoing a decoding and re-encoding process.

The resulting audio and video (A/V) content produced at the server may then be streamed to the STB 120, which in turn decodes the A/V stream and places the resulting information in the appropriate portion of the web page to composite the complete web page. The portions of the web page that are supported by the web browser in the STB 120 may be rendered before or concurrently with the information provided by the server. In other words, the data provided by the server may be sent to the STB 120 when needed to composite the complete page according to a predetermined approach or scheme. For example, the combination of supported and unsupported images and/or related content may be done utilizing a two-pass scheme in which supported content is rendered by the STB 120 first and unsupported content from the server is placed or overlaid on the web browser by the STB 120 after the supported content. In another example, the combination of supported and unsupported images and/or related content may be done utilizing a single-pass scheme in which the supported content is rendered by the STB 120 concurrently with the placement of the unsupported content from the server. Once the user moves away from that particular web page, the server may terminate the jobs related to that web page.

In another embodiment of the invention, the STB 120 may be operable to have all web page content handled by the server providing web browsing support to the STB 120. In such embodiments, the server may receive the URL information associated with the web page from the STB 120 and may in turn request the contents of the web page from the web server. The server may then encode the information in a format that may be received by the STB 120 and may stream the A/V content to the STB 120 to composite the complete web page.

In some embodiments of the invention, whether a server is handling a portion of the content of a web page or all of the content of a web page, the server may be operable to perform prediction operations regarding certain interactive content of the web page. For example, a user may typically expect immediacy and smoothness in their interaction with a cursor or pointer on a web browser. When a server is used to handle at least a portion of the content of a web page, the fast and clear feedback that the user expects on his or her actions may be affected by the latency in the operation between the server and the STB 120. To reduce such effects and improve the user experience, the server may be operable to predict certain non-destructive behavior (for example, motion) associated with the cursor or pointer.

In some instances, the web browser in the STB 120 may not be capable of providing support for certain content (for example, binary plug-ins) because such content is not native to the processor being utilized in the STB 120. For example, plug-ins that have been developed or coded for execution in an x86-based processor architecture may not be supported in a set-top-box having a processor based on a Microprocessor without Interlocked Pipeline Stages (MIPS) architecture. In such instances, changing the set-top-box design and/or providing an emulator of the x86-based processor in the set-top-box may be prohibitive.

Although the STB 120 with a broadband connection capability is illustrated in FIG. 1A for full internet experience, the invention may not be so limited. Accordingly, instead of the STB 120, the television 110 itself with a broadband connection capability for full Internet experience may be supported without departing from the spirit and scope of various embodiments of the invention.

FIGS. 1B and 1C are each a diagram that illustrates providing exemplary web browsing support for an STB by a local server and a remote server, respectively, in accordance with an embodiment of the invention. Referring to FIG. 1B, there is shown the STB 120, the local server 130, and a remote server 190. The remote server 190 may correspond to the server 150a in the server computing cloud 150, for example.

The STB 120 is shown communicatively coupled to the local server 130 via the broadband connection 140. The STB 120 is shown to be communicatively coupled to the remote server 190 via the broadband connections 140 and 145. In some embodiments of the invention, the broadband connections 140 and 145 may be coupled by, for example, a media gateway (not shown).

In some embodiments, the STB 120 may be configured to utilize the local server 130 for handling web browsing support requests from the STB 120. In such embodiments, the STB 120 may send one or more requests, R0, to the local server 130 for assistance in handling portions of a web page. Once the request or requests are received by the local server 130, the local server 130 may process the request and produce a data stream, DS0, which is sent to the STB 120 to composite or render the complete page according to a predetermined approach or scheme. The data stream DS0 may comprise audio and/or video. Once the user moves away from that particular web page, the local server 120 may suspend or terminate the jobs related to that web page.

Referring to FIG. 1C, in some embodiments of the invention, the STB 120 may be configured to utilize the remote server 190 for handling web browsing support requests from the STB 120. In such embodiments, the STB 120 may send one or more requests, R1, to the remote server 190 for assistance in handling portions of a web page. Once the request or requests are received by the remote server 190, the remote server 190 may process the request and produce a data stream, DS1, which is sent to the STB 120 to composite or render the complete page according to a predetermined approach or scheme. The data stream DS1 may comprise audio and/or video. Once the user moves away from that particular web page, the remote server 190 may terminate the jobs related to that web page.

In some embodiments of the invention, the STB 120 may be configured to send some requests, R0, to the local server 130, and other types of requests, R1, to the remote server 190. In such embodiments, whether certain types of requests are handled locally or remotely by a server may be based, at least partially, on the latency of the operations provided by the server and/or on the ability of the server to process certain types of requests.

FIG. 2 is a block diagram that illustrates an exemplary server that supports web page rendering by a local web browser in an STB, in accordance with an embodiment of the invention. Referring to FIG. 2, there is shown a server 200 that may comprise a processor 210, a content encoder 215, a memory 220, a security block 230, and an interface block 240. The content encoder 215 may be optional.

In some embodiments, the server 200 may correspond to the local server 130 and may be operable to provide web browsing support to the STB 120 described above, for example. In other embodiments, the server 200 may correspond to the server 150a in the server computing cloud 150 that may be operable to provide web browsing support to the STB 120.

The processor 210 may comprise suitable logic, circuitry, code, and/or interfaces that may be operable to process requests from the STB 120 to handle at least a portion of the content of a web page for subsequent rendering by the STB 120. In this regard, the processor 210 may be operable to convert and/or transcode content from one format into another format. For example, the processor 210 may be operable to process plug-ins unsupported by the web browser in the STB 120 and may encode such processed plug-ins with a low latency H.264/ACC encoder. The processor 210 may comprise a plurality of different encoders that may be utilized to encode different types of contents from a web page into different formats, for example.

The processor 210 may be operable to perform prediction operations associated with interactive content. Such prediction operations may be associated with non-desctructive events such as pointer movement or trajectory. For example, the processor 210 may be operable to predict a plurality of pointer locations associated with the pointer location in a web browser running on the STB 120. Such predicted pointer locations may be based on actual pointer location information provided to the processor 210 by the STB 120. The processor 210 may predict a predetermined number of pointer locations from a single actual pointer location. That is, for every actual pointer location update provided by the STB 120, the processor 210 may predict a number N of pointer locations. When a next actual pointer location update is provided, the processor 210 may predict a next N number of pointer locations. The number N of predicted pointer locations may vary in accordance with the latency of the connection between the server 200 and the STB 120. For example, when the connection is a high-bandwidth, low latency connection, there may not be a need to predict as many pointer locations because the STB 120 may be able to provide regular updated of actual pointer locations to the server 200.

The processor 210 may be operable to synchronize the server 200 with the STB 120. For example, the processor 210 may be operable to process event information (for example, keystroke event, click event) such that position and/or timing information in the server 200 may be synchronized with that of the STB 120. In some embodiments of the invention, the processor 210 may also utilize the actual pointer location information provided by the STB 120 to synchronize the server 200 to the STB 120.

In some embodiments of the invention, the processor 210 may be operable to determine a graphic symbol (for example, image, icon) for a pointer associated with a web page and to send the pointer graphic symbol to the STB 120 to composite the web page by rendering the pointer graphic symbol. The processor 210 may be operable to modify the pointer graphic symbol based on a location of the pointer in the web page.

The content encoder 215 may comprise suitable logic, circuitry, interfaces and/or code that may be operable to transform data processed by the processor 210 into format supported by the STB 120.

In some embodiments of the invention, the processor 210 may comprise an x86-based architecture that may support processing of, for example, certain plug-ins developed or coded for execution in an x86-based processor architecture. In other embodiments, the server 200 may be operable to provide an emulator of the x86-based processor to process certain content unsupported by the STB 120.

The server 200 may comprise a plurality of processors 210, as indicated by the dashed outlines illustrated in FIG. 2. A single server 200 may be operable to support a plurality of STBs 120. In such instances, the server 200 may be operable to provide load balance and/or load sharing capabilities.

The memory 220 may comprise suitable logic, circuitry, code, and/or interfaces that may be operable to store information associated with the operation of the processor 210. The memory 220 may be operable to store information (for example, coefficients, tables) associated with the encoding operations supported by the processor 210.

The security block 230 may comprise suitable logic, circuitry, code, and/or interfaces that may be operable to support authentication operations, certificate usage, and/or cryptographic operations that may be utilized to provide secure connections between the server and the STB 120, for example.

The interface block 240 may comprise suitable logic, circuitry, code, and/or interfaces that may be operable to enable the server 200 to communicate with the STB 120 and/or with a web server from which to obtain web page information, for example. The interface block 240 may support a plurality of physical and/or logical connections or interfaces. When the server 200 corresponds to the local server 130 described above, the interface block 240 may support communication with the STB 120 via the broadband connection 140 (for example, coaxial cable).

In operation, the server 200 may receive a request from the STB 120 and may obtain unsupported and/or supported content from the corresponding web server, may process the content received, and may encode the processed content into a format that may be received by the STB 120. The processing of unsupported content may comprise rendering unsupported plug-ins and/or other unsupported content, for example. The processing of supported content may comprise rendering supported plug-ins and/or other supported content. The resulting A/V content produced at the server 200 may then be streamed to the STB 120, which in turn decodes the A/V stream and composites the complete web page. In some embodiments of the invention, the processing of supported and/or supported content may comprise performing prediction operations on certain interactive content associated with the web page.

In some embodiments of the invention, when the content that may need to be processed in the server 200 is secure content, the server 200 and the STB 120 may need to perform a two-way authentication operation before establishing a secure link between them and having the STB 120 share credentials with the server 200.

Figure 3:
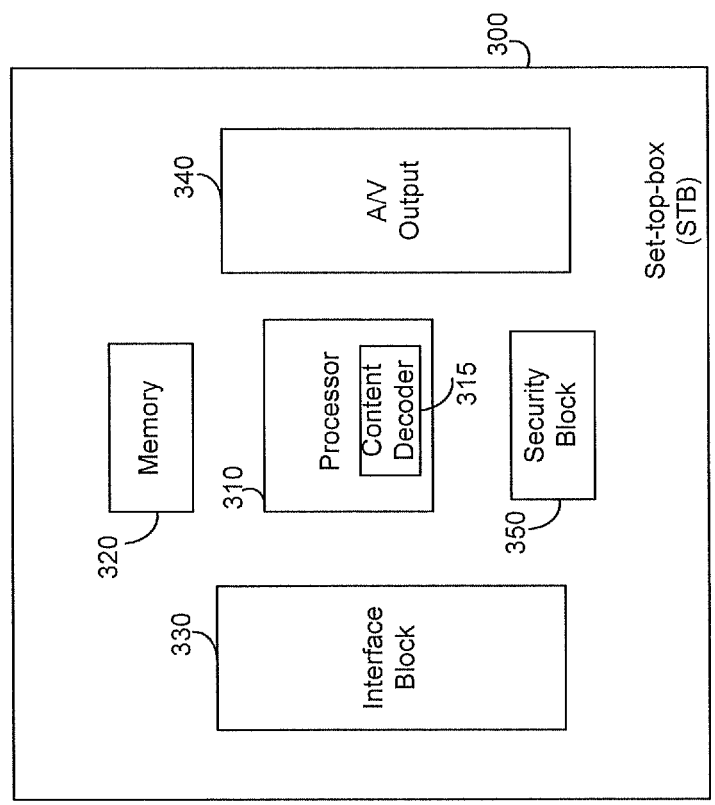
FIG. 3 is a block diagram that illustrates an exemplary STB that enables a user of the STB to access Internet services, in accordance with an embodiment of the invention.

FIG. 3 is a block diagram that illustrates an exemplary STB that enables a user of the STB to access Internet services, in accordance with an embodiment of the invention. Referring to FIG. 3, there is shown an STB 300 that may comprise a processor 310, a content decoder 315, a memory 320, a security block 350, an interface block 330, and an A/V output 340. The content decoder 315 may be optional. In some embodiments, two or more of the components of the STB 300 may be integrated into a single chip.

The processor 310 may comprise suitable logic, circuitry, code, and/or interfaces that may be operable to provide processing associated with managing, delivering, and/or storing video content that may be displayed on, for example, the television 110 described above. The processor 310 may also be operable to run or execute a web browser that may be displayed on the screen of the television 110 for user interaction.

The processor 310 may be operable to perform a pre-fetch operation of web page information provided by a web server to determine the type of content that is comprised within the web page. The processor 310 may be operable to perform the pre-fetch operation as a background process, for example.

The processor 310 may be operable to make one or more requests for handling either certain portions of a web page or the entire web page to a server that is operable to provide web browsing support to the STB 300. The processor 310 may be operable to receive an A/V stream from such server and composite a complete web page on the web browser. In this regard, the processor 310 may be operable to render supported content from a web page, such as plug-ins, graphics, text, or the like, for example, on a web browser, and compositing the complete web page on the web browser by placing decoded A/V streams from a server on top of the generated or rendered content. In some embodiments of the invention, the processor 310 may render the supported visual portions of the web page concurrently with the placement of the decoded A/V streams from a server.

The processor 310 may be operable to process event information such as keystroke events, click events, and/or other like events (for example, gesture-based or action-based events). The event information may be sent to a server that is operable to provide web browsing support to the STB 300. The processor 310 may also be operable to process actual pointer location information and may provide such information to the server. The processor 310 may, for example, generate periodic or non-periodic updates of actual pointer location that may be sent to the server.

The content decoder 315 may comprise suitable logic, circuitry, interfaces and/or code that may be operable to transform data encoded by the local server 130 or the server computing cloud 150 into a desired format for display.

The memory 320 may comprise suitable logic, circuitry, code, and/or interface that may be operable to store information associated with the operation of the processor 310.

The security block 350 may comprise suitable logic, circuitry, code, and/or interfaces that may be operable to support authentication operations, certificate usage, and/or cryptographic operations that may be utilized to provide a secure connection between a server, which may be operable to provide web browsing support to the STB 300, and the STB 300, for example.

The interface block 330 may comprise suitable logic, circuitry, code, and/or interfaces that may enable the STB 330 to interface with a plurality of devices, including render servers and/or web servers. For example, the interface block 330 may support connections with cable TV services and/or satellite services. The interface block 330 may support multiple ports such as High-Definition Multimedia Interface (HDMI), Ethernet Physical Layer (PHY), Universal Serial Bus (USB), and RS232, for example. Other types of connections, protocols, and/or ports may also be supported.

The A/V output 340 may comprise suitable logic, circuitry, code, and/or interfaces that may be operable to provide audio and/or video content for display or reproduction to, for example, the television 110 described above. In this regard, the A/V output 340 may support multiple technical standards such as DTV and HDTV, and/or multiple screen resolutions.

In operation, a web browser may be run in the STB 300 and may be displayed in a television, for example television 110, via the A/V output 340. When a user interacts with the web browser, for example via a set-top-box remote control or keyboard, and submits a URL to the web browser, the STB 300 may send a request for the information resource associated with that URL to a web server via the interface block 330. The web server may pass the HTML and/or related content or information associated with the URL to the STB 300 via the interface block 330. The processor 310 may perform a prefetch operation of the web page information provided by the web server to determine the type of content that is comprised within the web page.

The processor 310 may send one or more requests to a server that is operable to provide web browsing support to the STB 300 via the interface block 330. The request may comprise information regarding the URL of the web page. In response, the server may send an A/V stream to the STB 300. The processor 310 in the STB 300 may decode the A/V stream and may render the resulting information to composite the complete web page.

In some embodiments of the invention, the processor 310 may send, along with or separate from the requests, event information (for example, keystroke event, click event) and/or actual pointer location information.

Although an STB with a broadband connection capability is illustrated in FIG. 3 for full Internet experience, the invention may not be so limited. Accordingly, other devices such as a television itself with a broadband connection capability for full Internet experience may be supported without departing from the spirit and scope of various embodiments of the invention.

Figure 4:
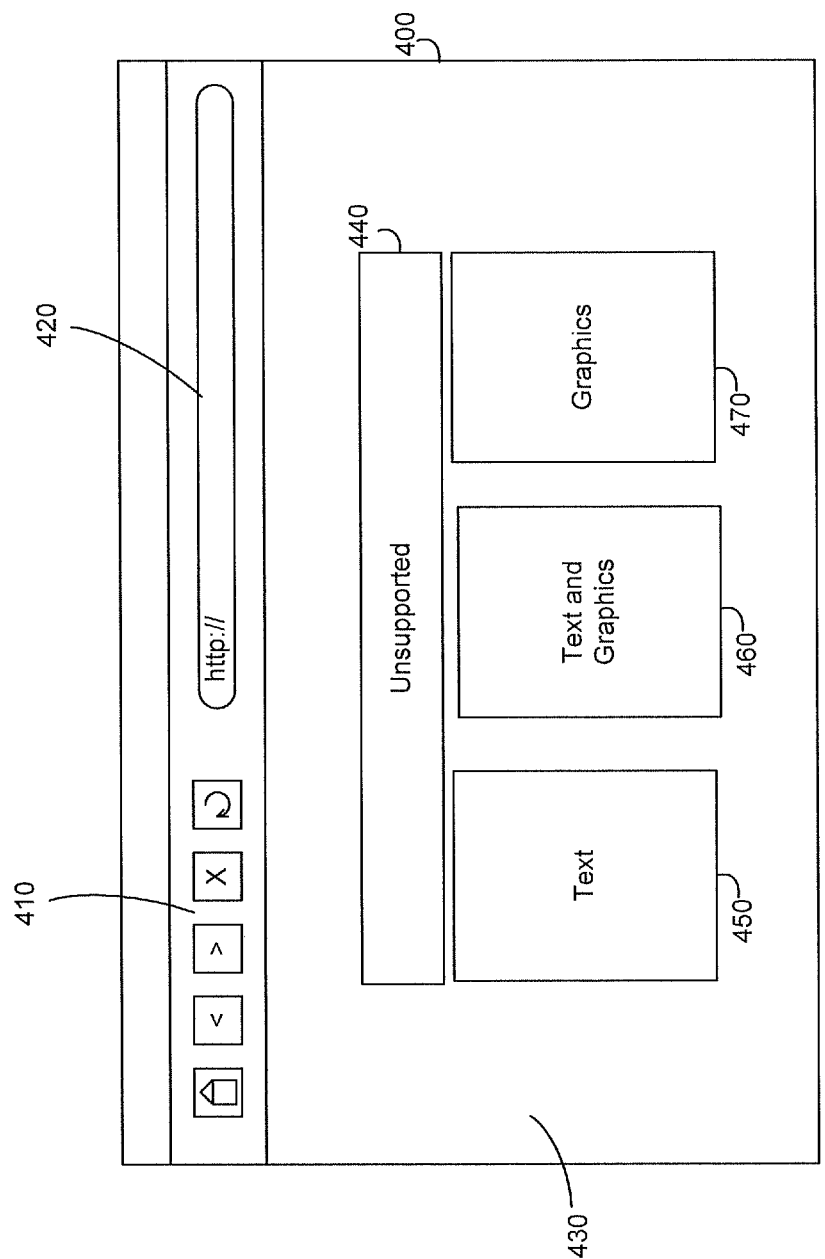
FIG. 4 is a diagram that illustrates an exemplary web page with multiple content types that is to be displayed by a local web browser in an STB, in accordance with an embodiment of the invention.

FIG. 4 is a diagram that illustrates an exemplary web page with multiple content types that is to be displayed by a local web browser in an STB, in accordance with an embodiment of the invention. Referring to FIG. 4, there is shown a web browser 400 in which a web page 430 is to be displayed or rendered. The web browser 400 may comprise certain user interface elements 410 (for example, back, forward, reload, stop, home) that may be utilized for navigation and/or operation, and an address bar 420 that may be utilized to submit a URI.

The web page 430 to be displayed in the web browser 400 may comprise different types of contents. In the example illustrated in FIG. 4, the web page 430 may comprise a text portion 450, a text and graphics portion 460, a graphics portion 470, and an unsupported (for example, plug-ins) portion 440. When the STB performs a pre-fetch operation to determine the types of content in the web page, it may determine that the unsupported portion 440 may be a portion of the web page for which the STB may need support from a sever. In this regard, the STB may identify the unsupported portion 440 to a server via a request for assistance. The server may then process the unsupported portion 440 and may subsequently provide the processed content associated with the unsupported portion 440 back to the STB in a format that the STB may utilize to composite the web page 430 in the web browser 400.

Figure 5A:
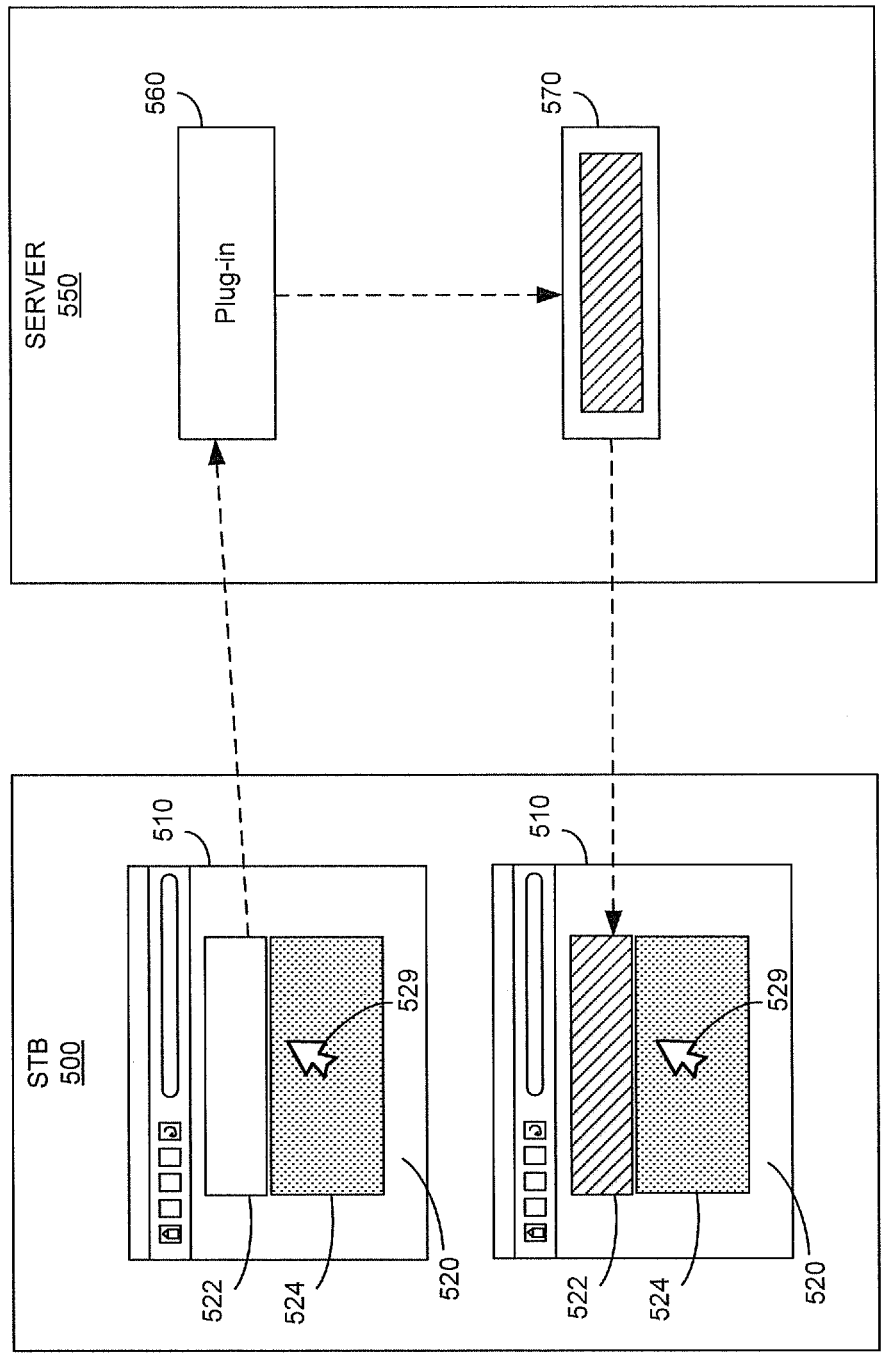
FIGS. 5A-5C are each a diagram that illustrates an example of interactive content rendering when using a server for web browsing support of an STB, in accordance with an embodiment of the invention.
Figure 5B:
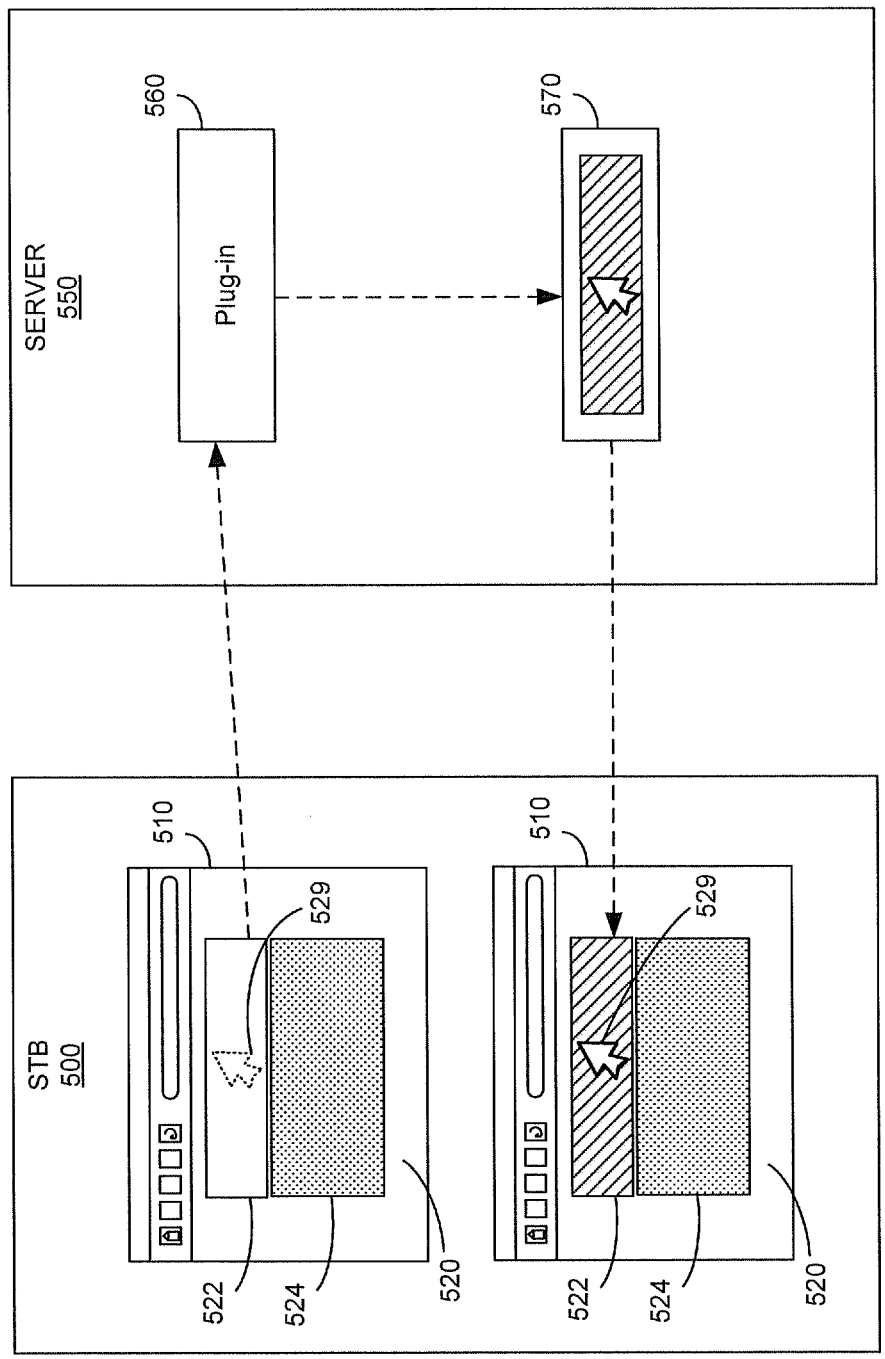
Figure 5C:
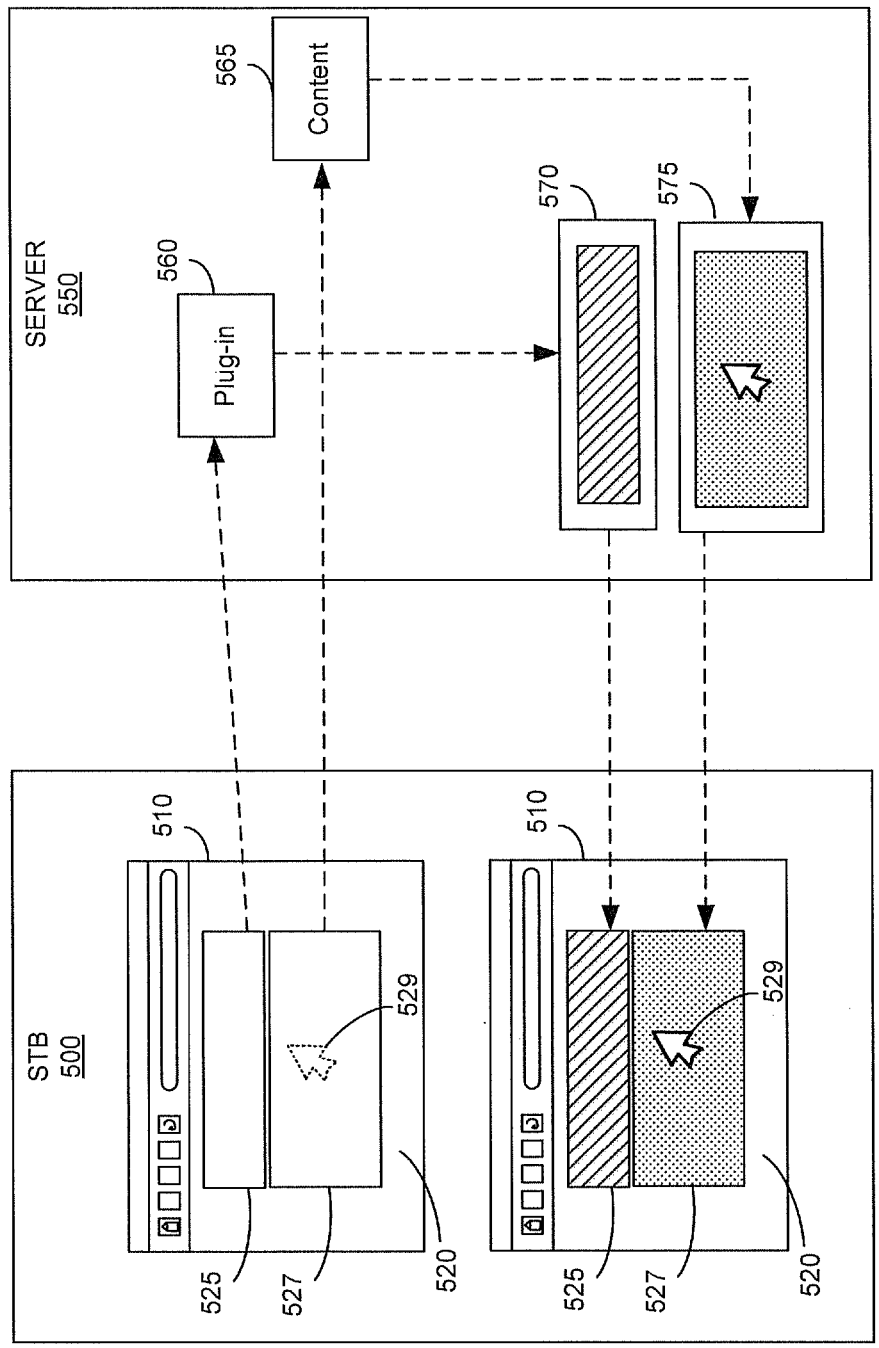

FIGS. 5A-5C are each a diagram that illustrates an example of interactive content rendering when using a server for web browsing support of an STB, in accordance with an embodiment of the invention. Referring to FIG. 5A, there is shown an STB 500 and a server 550. The STB 500 may correspond to, for example, the STB 120 described above. In this regard, the STB 500 may have an architecture that is substantially similar to the exemplary architecture of the STB 300 described above. The server 550 may correspond to, for example, the local server 130 and/or the server 150*a* in the server computing cloud 150 described above. In this regard, the server 550 may have an architecture that is substantially similar to the exemplary architecture of the server 200 described above.

Also shown in FIG. 5A is a web browser 510 running on the STB 500. The web browser 510 may be displayed on a television or other display device communicatively coupled with the STB 500 to enable user interaction. Illustrated in the web browser 510 is a web page 520, which is to be composited by the STB 500. The web page 520 may comprise a portion 524 (shown in a dotted pattern) that is supported by the web browser 510, and thus, by the STB 500. The web page 520 may also comprise a portion 522 (shown blank) that is unsupported by the web browser 510, and thus, by the STB 500. In the example shown in FIG. 5A, the unsupported content in the web page 520 may be a plug-in, such as an Adobe Shockwave Flash (SWF) plug-in. A cursor or pointer 529 is also shown that is located or positioned in the supported portion 522. The pointer 529 may correspond to interactive content of the web page 520, for example. In this example, the server 550 may be operable to process or handle those portions of the web page 520 that are not supported by the web browser 510.

In operation, the STB 500 may determine that the web page 520 comprises a portion 522 associated with an unsupported plug-in. The STB 500 may send a request to the server 550 to assist in the handling processing of the plug-in. The request may comprise one or more of the plug-in URL, the size of the plug-in in the web page 520, and other related events associated with the plug-in. The server 550 may receive the request and obtain an instance of the Adobe SWF plug-in 560 based on the URL information provided by the STB 500. The server 550 may then process the plug-in 560 and may encode the resulting output from the processing with a low latency encoding operation such as H.264/AAC to produce an A/V data 570 (shown in hash lines). After the A/V data is produced by the server 550, the server 550 may stream the A/V data to the STB 500. The STB 500 may then decode the A/V stream and may composite or render the complete web page by combining the images associated with the supported content 524 (dotted pattern) rendered by the STB 500, which includes the pointer 529, and the unsupported content 522 (hashed lines) processed by the server 550. In this example, because the pointer 529 is not located within the portion of the web page that is being handled by the server 550, the server 550 need not perform rendering of the pointer 529.

Referring to FIG. 5B, there is shown the web page 520 in the web browser 510 running on the STB 500. Also shown is the server 550. In this example, the server 550 may be operable to process or handle those portions of the web page 520 that are not supported by the web browser 510. In this regard, the pointer 529 is located in the unsupported portion 522 of the web page 520 that is to be handled by the server 550.

In operation, in addition to processing the plug-in 560, the server 550 may process information associated with the pointer 529 to render the pointer 529 when producing the A/V data 570. The information associated with the pointer 529 may comprise actual pointer location information provided by the STB 500, for example. Such information, however, may be updated by the STB 500 only at certain instances and may not be available for each location at which the pointer 529 is to be rendered. In this regard, the server 550 may perform prediction operations on the pointer 529 to render the pointer 529 when actual pointer information is not available for a location. In this manner, the user may be provided with the appearance of a smooth interaction with the pointer 529. That is, because of the latency that may occur in having the server 550 handle the processing of the unsupported portion 522 and because of a user's typical expectations of fast and clear feedback from his or her interactions with the web browser 510, pointer location prediction may be utilized to render the pointer 529 in a manner that provides the user with a perception of smooth, real-time interaction.

After the A/V data 570 that comprises a rendering of the pointer 529 is produced by the server 550, the server 550 may stream the A/V data to the STB 500. Such rendering of the pointer 529 may be based on actual pointer location information and/or predicted pointer location information. The STB 500 may then decode the A/V stream and may composite or render the complete web page by combining the images associated with the supported content 524 rendered by the STB 500 and the unsupported content 522 processed by the server 550, which includes the pointer 529.

Referring to FIG. 5C, there is shown the web page 520 in the web browser 510 running on the STB 500. Also shown is the server 550. In this example, the server 550 may be operable to handle the rendering of the various contents that comprise the web page 520. The web page 520 may comprise a portion 525 associated with a plug-in and a portion 527 associated with other type of content. The pointer 529 is located in the portion 527 of the web page 520 and the rendering of the pointer 529 is to be handled or processed by the server 550.

In operation, the server 550 may process the plug-in 560 associated with the portion 525 of the web page 520 to produce the A/V data 570. The server 550 may also process the content 565 associated with the portion 527 of the web page 520 to produce an data 575. The server 550 may process information associated with the pointer 529 to render the pointer 529 when producing the A/V data 575. The information associated with the pointer 529 may comprise actual pointer location information provided by the STB 500, for example. Such information, however, may be updated by the STB 500 only at certain instances and may not be available for each location at which the pointer 529 is to be rendered. In this regard, the server 550 may perform prediction operations on the pointer 529 to render the pointer 529 when actual pointer information is not available for a location.

After the A/V data 570 and the A/V data 575 that comprises a rendering of the pointer 529 are produced by the server 550, the server 550 may stream the A/V data to the STB 500. The STB 500 may then decode the A/V data and may composite or render the complete web page by combining the images associated with the portions 525 and 527 of the web page 520 processed by the server 550.

Figure 6:
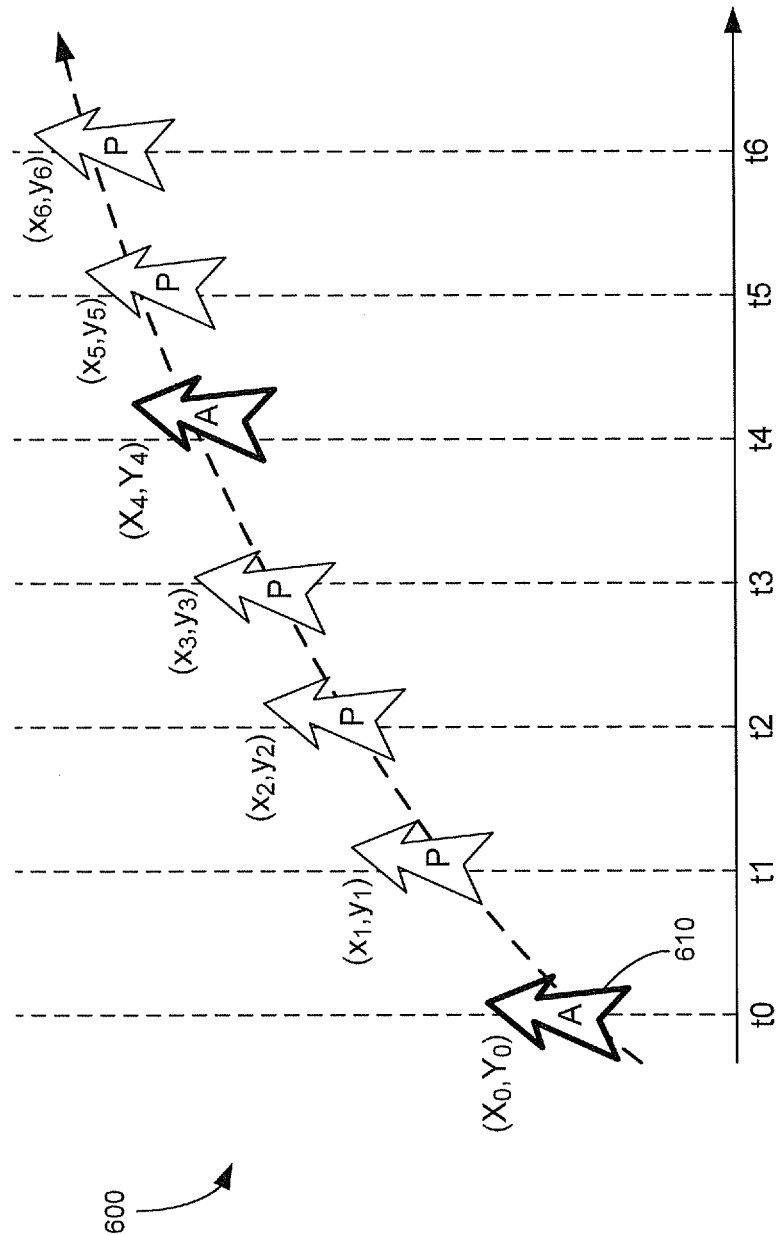
FIG. 6 is a diagram that illustrates an example of predicted pointer locations, in accordance with an embodiment of the invention.

FIG. 6 is a diagram that illustrates an example of predicted pointer locations, in accordance with an embodiment of the invention. Referring to FIG. 6, there is shown a pointer path 600 associated with a pointer 610. The pointer 610 may be rendered by a sever, such as the server 550 described above, when supporting web browsing operations for an STB, such as the STB 500, for example. The pointer 610 may be rendered at a plurality of positions at different instances. In this regard, the sizes, distances, and/or times illustrated in FIG. 6 may be exaggerated for illustration purposes.

The pointer path 600 may correspond to trajectory or motion of a cursor or pointer in a web page being displayed on a web browser running on an STB. The trajectory may result from the user's interaction with the web browser. The user may produce such a trajectory by moving a device, for example, wireless remote, mouse, keyboard, trackball, and/or motion/gesture sensor, which the user utilizes to interact with the web browser.

In operation, the server may receive actual pointer location information from the STB for certain locations associated with the pointer path 600. For example, at time instant t0, the pointer 610 is labeled "A" and is shown in a heavy line width to indicate that the rendering by the server at the location with coordinates $(X_0, Y_0)$ is based on actual pointer location provided by the STB. Similarly, at time instant t4, the pointer 610 is labeled "A" to indicate that the rendering by the server at the location with coordinates $(X_4, Y_4)$ is also based on actual pointer location provided by the STB.

At time instants t1, t2, and t3, for example, the server may need to predict the location of the pointer 610 to provide a smooth experience for the user because the actual pointer location information may not be available again until time instant t4. At time instants t1, t2, and t3, the pointer 610 is labeled "P" and is shown in a light line width to indicate that the rendering by the server at the locations with coordinates $(x_1, y_1)$, $(x_2, y_2)$, and $(x_3, y_3)$, respectively, are based on predicted pointer locations generated by the server. In this example, the predicted location at time instants t1, t2, and t3 may be based on the actual pointer location $(X_0, Y_0)$ at time instant t0.

Similarly, at time instant t5 and t6, for example, the server may need to predict the location of the pointer 610 to provide a smooth experience for the user because the actual pointer location information may not be available. At time instant t5 and t6, the pointer 610 is labeled "P" and is shown in a light line width to indicate that the rendering by the server at the locations with coordinates $(x_5,y_5)$ and $(x_6,y_6)$, respectively, are based on predicted pointer locations generated by the server. In this example, the predicted location at time instants t5 and t6 may be based on the actual pointer location $(X_0,Y_0)$ at time instant t0 and/or the actual pointer location $(X_4,Y_4)$ at time instant t4. That is, predicted pointer locations may be based on one or more actual pointer locations provided by the STB.

Figure 7:
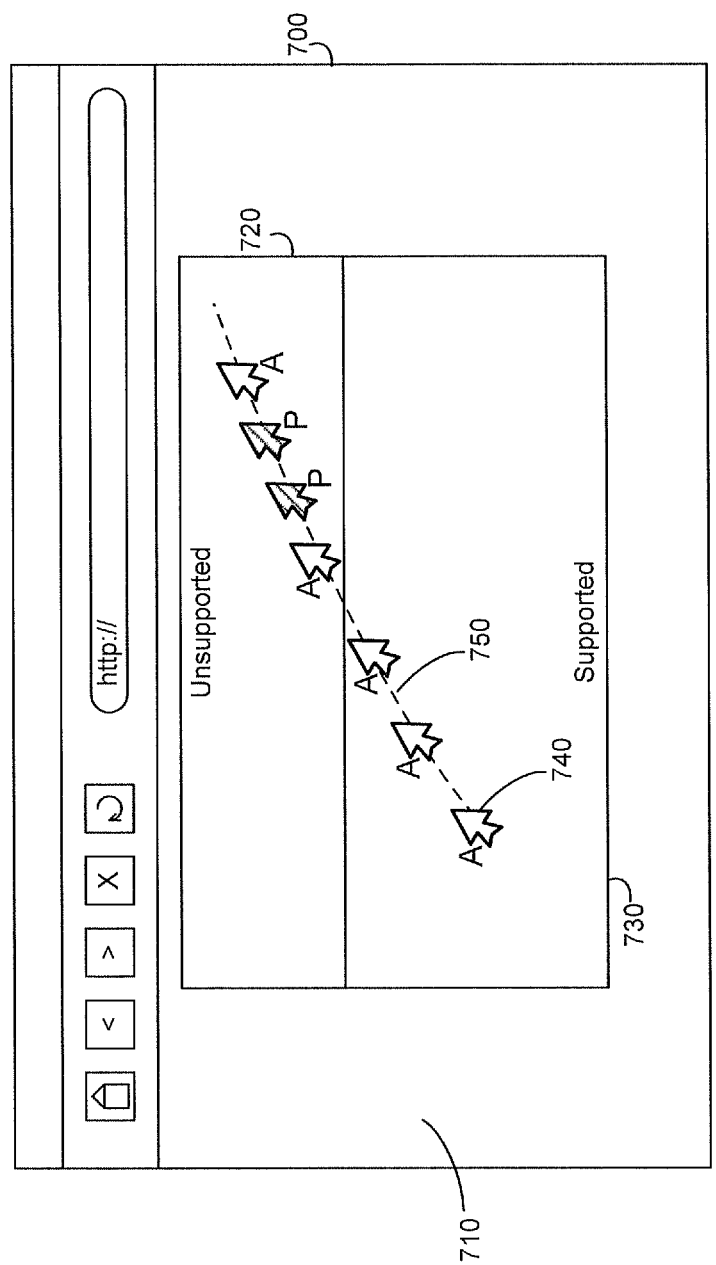
FIG. 7 is a diagram that illustrates an example of pointer rendering based on predicted pointer locations, in accordance with an embodiment of the invention.

FIG. 7 is a diagram that illustrates an example of pointer rendering based on predicted pointer locations, in accordance with an embodiment of the invention. Referring to FIG. 7, there is shown a web browser 700 in which a web page 710 is rendered or composited. The web browser 700 may correspond to, for example, the web browser 400. The web browser 700 may be running on an STB such as the STB 500, for example. The web page 710 may comprise a portion 720 that may unsupported by the web browser 700 and a portion 730 that may be supported by the web browser 700. In the example shown in FIG. 7, a server, such as the server 550, may be operable to provide web browsing support to the STB for those portions of the web page 710 that are not supported by the web browser 700. In this regard, the supported portion 730 may be rendered locally by the STB while the unsupported portion 720 may be rendered by the server.

Also shown in FIG. 7 is a pointer 740 and a pointer path 750 associated with a motion or action of a user interacting with the web browser 700 via the pointer 740. The pointer 740 may be rendered at a plurality of positions at different instances. In this regard, the sizes, distances, and/or instances illustrated in FIG. 7 may be exaggerated for illustration purposes.

In operation, a portion of the pointer path 750 may run along the supported portion 730 of the web page 710. For this portion of the pointer path 750, the STB may render the supported portion 730 and the various instances of the pointer 740 in the supported portion 730. Such instances of the pointer 740 are labeled "A" to indicate that the STB may render the pointer 740 with actual pointer location information. That is, the STB, when rendering a portion of the web page 710, may not need to perform pointer location prediction to provide a smooth and/or real-time interaction to the user.

Another portion of the pointer path 750 may run along the unsupported portion 720 of the web page 710. For this portion of the pointer path 750, the server may render the unsupported portion 720 (for example, plug-in) and the various instances of the pointer 740 in the unsupported portion 720. Some rendered instances of the pointer 740 in the unsupported portion 720 are labeled "A" to indicate that the server may render the pointer 740 with actual pointer location information provided by the STB. Other rendered instances of the pointer 740 in the unsupported portion 720 are labeled "P" to indicate that the server may render the pointer 740 with predicted pointer location information generated from actual pointer location information provided by the STB. That is, the server, when rendering a portion of the web page 710, may need to perform pointer location prediction to provide a smooth and/or real-time interaction to the user.

Figure 8:
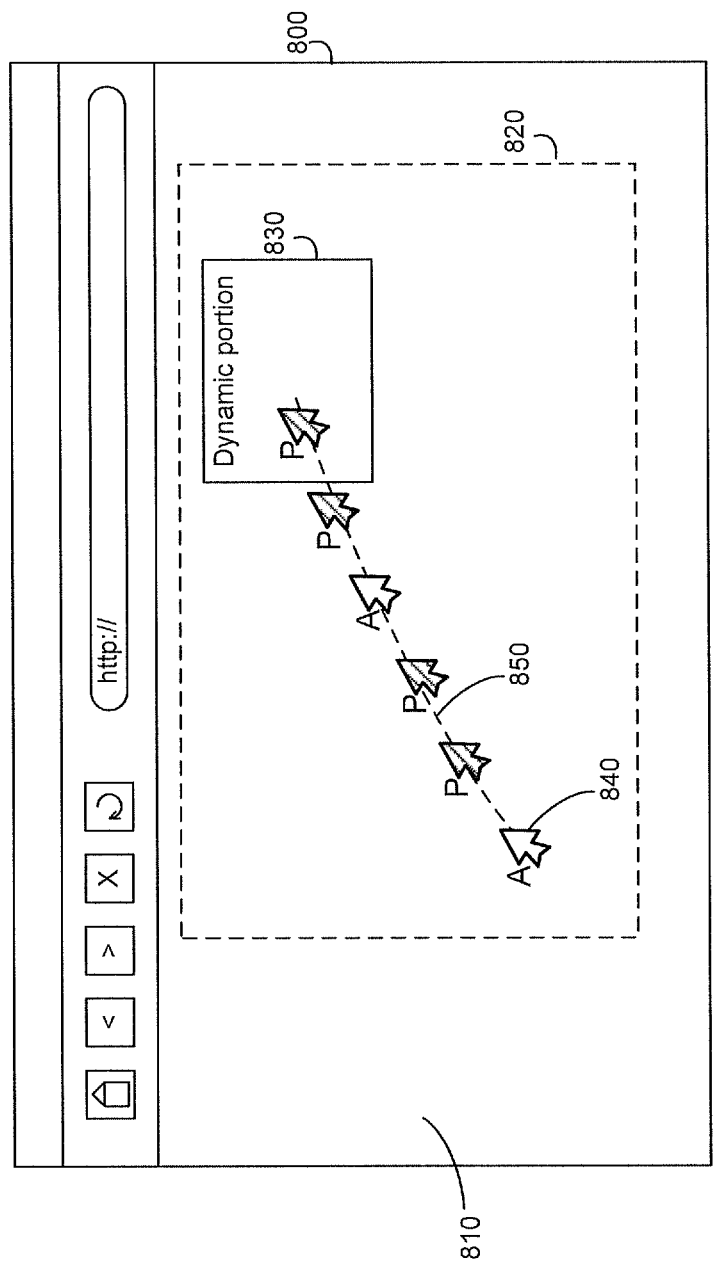
FIG. 8 is a diagram that illustrates an example of pointer location prediction in a dynamic portion of a web page, in accordance with an embodiment of the invention.

FIG. 8 is a diagram that illustrates an example of pointer location prediction in a dynamic portion of a web page, in accordance with an embodiment of the invention. Referring to FIG. 8, there is shown a web browser 800 in which a web page 810 is rendered or composited. The web browser 800 may correspond to, for example, the web browser 400 described above. The web browser 800 may be running on an STB such as the STB 500, for example, also described above. The web page 810 may comprise a portion 820 that may be unsupported or not rendered by the web browser 700. The portion 820 may comprise a portion 830 associated with dynamic content, such as dynamic HTML, for example. In the example shown in FIG. 8, a server, such as the server 550, for example, may be operable to provide web browsing support to the STB for those portions of the web page 810 that are not supported or may not be rendered by the web browser 800.

Also shown in FIG. 8 is a pointer 840 and a pointer path 850 associated with a motion or action of a user interacting with the web browser 800 via the pointer 840. The pointer 840 may be rendered at a plurality of positions at different instances. In this regard, the sizes, distances, and/or instances illustrated in FIG. 8 may be exaggerated for illustration purposes.

In operation, the pointer path 850 may run along the portion 820 of the web page 810. The server may render the pointer 840 along the pointer path 850. Some rendered instances of the pointer 840 are labeled "A" to indicate that the server may render the pointer 840 with actual pointer location information provided by the STB. Other rendered instances of the pointer 840 are labeled "P" to indicate that the server may render the pointer 840 with predicted pointer location information generated by the server from actual pointer location information provided by the STB. The ratio of the number of predicted pointer locations to actual pointer locations may be a predetermined or dynamically determined number. In the example shown in FIG. 8, two (2) predicted pointer locations may be generated for each actual pointer location provided. Such ratio may vary or may be adjusted based on the latency between the server and the STB. When the latency between the server and the STB is low, fewer predictions may be needed and the ratio of predicted pointer locations to actual pointer locations may be reduced. On the other hand, the ratio may be increased when the latency between the server and the STB is high.

When the server determines, based on one or more predictions of the pointer location that the user appears to be moving the pointer 840 to the dynamic portion 830, the server may be operable to perform certain rendering operations based on the likelihood that the pointer 840 is to be placed over the dynamic portion 830 by the user. The server may render changes in graphics, images, text, and/or other content associated with the dynamic portion 830, for example, based on predicted pointer location. In one example, the server may render a change in color in a radial button in the dynamic portion 830. Again, such predictive operations may be performed by the server to provide the user with a perception of real-time operation.

Figure 9:
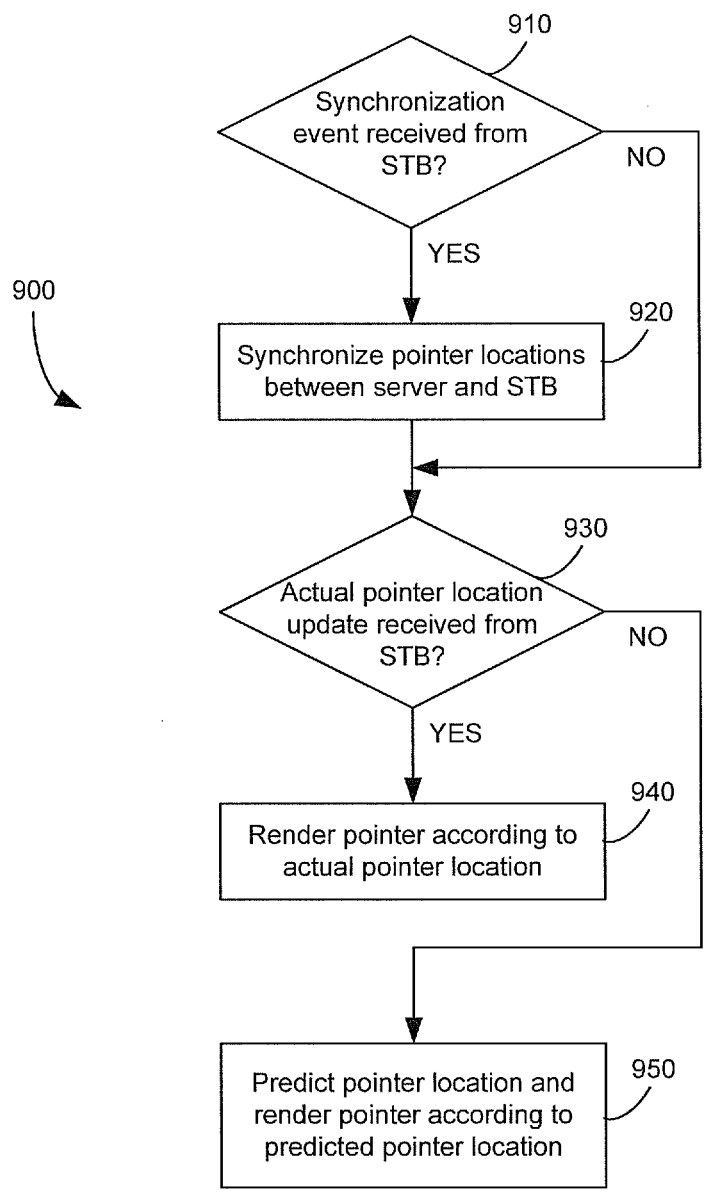
FIG. 9 is a flow diagram that illustrates exemplary steps for reducing latency for interactive content with web browsing support for an STB by server processing, in accordance with an embodiment of the invention.

FIG. 9 is a flow diagram that illustrates exemplary steps for reducing latency for interactive content with web browsing support for an STB by server processing, in accordance with an embodiment of the invention. Referring to FIG. 9, there is shown a flow graph 900. In step 910, a server, such as the server 550, for example, may determine whether a STB, such as the STB 500, for example, may have sent an indication of a navigation event such as a keystroke or click, which may be utilized to synchronize the web browsing support operations provided by the server with the operations of the STB. When one or more of such navigation events are received at the server, the process may proceed to step 920 in which the server synchronizes pointer locations, for example, between the server and the STB. The process may then proceed to step 930. When such navigation events are not received at the server in step 910, the process may proceed directly to step 930.

In step 930, the server may determine whether an actual pointer location update has been provided by the STB. When an update has been received by the server, the process may proceed to step 940 in which the server may render a pointer based on actual pointer location information. When an update has not been received by the server, the process may proceed to step 950 in which the server may first predict a location of the pointer to be rendered and may then render the pointer according to the predicted location.

Figure 10A:
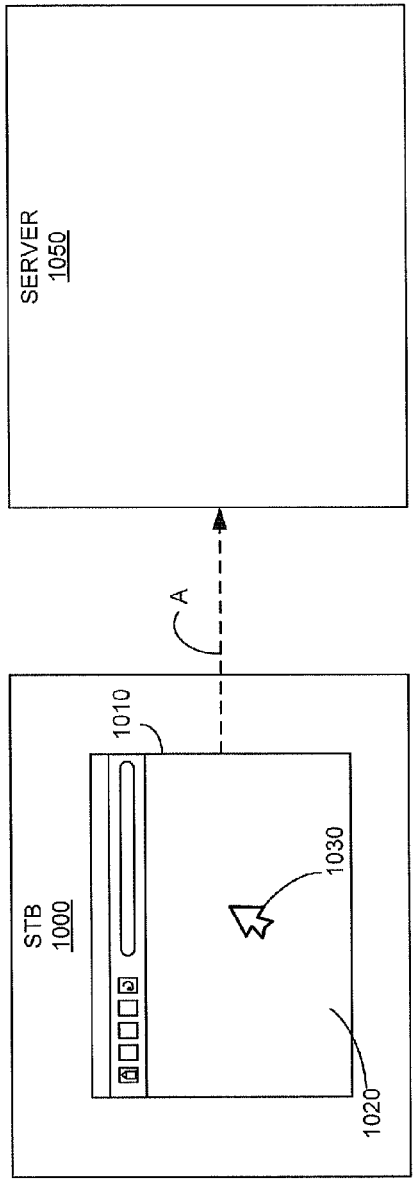
FIGS. 10A and 10B are each a diagram that illustrate an example in which the pointer image may be determined at the server, in accordance with an embodiment of the invention.
Figure 10B:
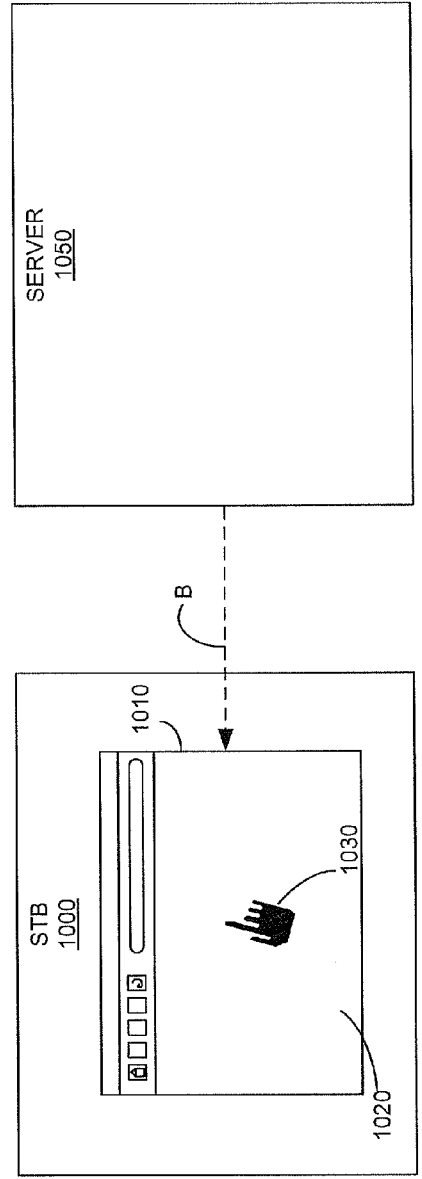

FIGS. 10A and 10B are each a diagram that illustrate an example in which the pointer image may be determined at the server, in accordance with an embodiment of the invention. Referring to FIG. 10A, there is shown an STB 1000 and a server 1050 that may correspond to, for example, the STB 500 and the server 550. Also shown in FIG. 10A is a web browser 1010 running on the STB 1000 that may correspond to the web browser 510. Illustrated in the web browser 1010 is a web page 1020, which is to be composited by the STB 1000. A pointer 1030 is also shown in the web browser 910 and is illustrated as having the shape of an arrow. In this example, the STB 1000 may be operable to render the web page 1020. Referring to FIG. 10B, the pointer 1030 is now illustrated as having a different shape, that of a pointing hand. The change in the image of the pointer 1030 may be based on the web page 1020, for example, and may be determined by the server 1050.

In operation, the STB 1000 may perform a pre-fetch operation of the web page information to determine the type of content within the web page 1020. The STB 1000 may send information associated with the web page 1020 (for example, content types, URL) to the server 1050 via a signal A. The server 1050 may determine a graphical representation or symbol associated with the pointer 1030 and may vary or change an existing pointer graphic symbol based on, for example, contents associated with the web page 1020. In some instances, when a pointer has not yet been rendered, the server 1050 may determine an initial pointer graphic symbol to be used. The server 1050 may send the information associated with the pointer graphic symbol to the STB 1000 via a signal B such that the STB 1000 may composite the web page 1020 and render the pointer 1030 based on the pointer graphic symbol provided.

Referring back to FIGS. 5A-5C, the server 550, which is communicatively coupled to the STB 500, may predict a location of the pointer 529 on the web browser 510 running on the STB 500. The server 550 may render the pointer based on the predicted pointer location. The server 550 may send the rendered pointer to the STB 500, wherein the STB 500 may composite the web page 520 on the web browser 510 based on the rendered pointer. The server 550 and the STB 500 may be synchronized based on event information received by the server 550 from the STB 500. The event information may comprise one or both of a keystroke event and a click event. The predicting of the pointer location may be based on actual pointer location information provided by said STB.

The server 550 may render the pointer 529 when the predicted pointer location is within a portion of the web page 520, which is unsupported by said web browser, such as portion 522, for example, which is processed by the server 550. A predetermined number of pointer locations may be predicted based on actual pointer location information provided by the STB 500. The predetermined number of predicted pointer locations may also be based on a latency of a connection between the server 550 and the STB 500. The predetermined number of predicted pointer locations may be adjusted when the latency of the connection between the server 550 and the STB 500 is changed. A dynamic portion of the web page 520 may be modified based on the predicted pointer location.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for reducing latency for interactive content for complete Internet anywhere.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
predicting, in a server communicatively coupled to a set-top-box (STB), a group of pointer locations for a web browser running on said STB, said predicted pointer locations based on an actual pointer location provided by said STB, said group of predicted pointer locations having a number of predicted pointer locations that is based on a latency of a connection between said server and said STB;
rendering a pointer, in said server, based on said group of predicted pointer locations; and
sending said rendered pointer to said STB, wherein said STB composites a web page on said web browser based on said rendered pointer.

2. The method according to claim 1, comprising synchronizing said server with said STB based on event information received by said server from said STB.

3. The method according to claim 2, wherein said event information comprises a keystroke event, a click event, or both.

4. The method according to claim 1, wherein said pointer is associated with said web page, the method comprising:
- determining, in said server, a graphic symbol for said pointer associated with said web page; and
- sending said graphic symbol to said STB, wherein said STB further composites said web page by rendering said pointer as said graphic symbol.

5. The method according to claim 4, comprising modifying said graphic symbol based on said predicted pointer locations of said pointer in said web page.

6. The method according to claim 1, comprising rendering said pointer in said server when said predicted pointer location is within a portion of said web page which is unsupported by said web browser.

7. The method according to claim 6, wherein said unsupported portion of said web page is processed by said server.

8. The method according to claim 1, comprising modifying a dynamic portion of said web page based on said predicted pointer locations.

9. A method comprising:
- predicting, in a server communicatively coupled to a set top box (STB), a group of pointer locations for a web browser running on the STB, said predicted pointer locations based on an actual pointer location provided by said STB, said group of predicted pointer locations having a number of predicted pointer locations;
- adjusting said number of predicted pointer locations in response to a change in latency of a connection between said server and said STB;
- rendering said pointer in said server based on said group of predicted pointer locations; and
- sending said rendered pointer to said STB, wherein said STB composites a web page on said web browser based on said rendered pointer.

10. The method according to claim 9, comprising rendering said pointer in said server when said predicted pointer location is within a portion of said web page which is unsupported by said web browser.

11. The method according to claim 9, comprising modifying a dynamic portion of said web page based on said predicted pointer location locations.

12. A system comprising:
- one or more processors, one or more circuits, or any combination thereof for use in a server, said one or more processors, said one or more circuits, or said combination thereof being operable to:
- predict a group of pointer locations for a web browser running on a set top box (STB) communicatively coupled to said server, said predicted pointer locations based on an actual pointer location provided by said STB, said group of predicted pointer locations having a number of predicted pointer locations that is based on a latency of a connection between said server and said STB;
- render said pointer in said server based on said group of predicted pointer locations; and
- send said rendered pointer to said STB, wherein said STB composites a web page on said web browser based on said rendered pointer.

13. The system according to claim 12, wherein said one or more processors, said one or more circuits, or said combination thereof are operable to render said pointer when said predicted pointer location is within a portion of said web page which is unsupported by said web browser.

14. The system according to claim 13, wherein said unsupported portion of said web page is processed by said server.

15. The system according to claim 13, wherein said pointer is rendered as a graphic symbol based upon content associated with said unsupported portion of said web page.

16. The system according to claim 12, wherein said one or more processors, said one or more circuits, or said combination thereof are operable to modify a dynamic portion of said web page based on said predicted pointer locations.

17. The system according to claim 12, wherein said pointer is rendered as a graphic symbol based at least in part upon said predicted pointer locations of said pointer.

18. A system comprising:
- one or more processors, one or more circuits, or any combination thereof for use in a server, said one or more processors, said one or more circuits, or said combination thereof being operable to:
- predict a group of pointer locations for a web browser running on a set top box (STB) in communication with the server, said predicted pointer locations based on an actual pointer location provided by said STB, said group of predicted pointer locations having a number of predicted pointer locations;
- adjust said number of predicted pointer locations when a latency of a connection between said server and said STB is changed;
- render said pointer in said server based on said group of predicted pointer locations; and
- send said rendered pointer to said STB, wherein said STB composites a web page on said web browser based on said rendered pointer.

19. The system according to claim 18, wherein said one or more processors, said one or more circuits, or said combination thereof are operable to synchronize said server with said STB based on event information received by said server from said STB.

20. The system according to claim 19, wherein said event information comprises a keystroke event, a click event, or both.

* * * * *

UNITED STATES PATENT AND TRADEMARK OFFICE
CERTIFICATE OF CORRECTION

| | | |
|---|---|---|
| PATENT NO. | : 8,954,538 B2 | Page 1 of 1 |
| APPLICATION NO. | : 12/650171 | |
| DATED | : February 10, 2015 | |
| INVENTOR(S) | : David Erickson et al. | |

It is certified that error appears in the above-identified patent and that said Letters Patent is hereby corrected as shown below:

Claims

Please replace column 19, line 42, claim 11, with the following corrected version:

-- dicted pointed locations. --

Signed and Sealed this
Twenty-second Day of March, 2016

Michelle K. Lee
*Director of the United States Patent and Trademark Office*